(12) United States Patent
Kim et al.

(10) Patent No.: US 7,659,036 B2
(45) Date of Patent: Feb. 9, 2010

(54) LITHIUM RECHARGEABLE BATTERY INCLUDING A POROUS MEMBRANE SEPARATOR FORMED OF CERAMIC SECONDARY PARTICLES AND A BINDER

(75) Inventors: Jinhee Kim, Yongin-si (KR); Wonchull Han, Yongin-si (KR); Jaevun Min, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 147 days.

(21) Appl. No.: 11/489,536

(22) Filed: Jul. 20, 2006

(65) Prior Publication Data

US 2007/0020525 A1 Jan. 25, 2007

(30) Foreign Application Priority Data

Jul. 22, 2005 (KR) .................. 10-2005-0066872

(51) Int. Cl.
*H01M 2/16* (2006.01)
*H01M 6/18* (2006.01)
*H01M 2/14* (2006.01)

(52) U.S. Cl. .................. 429/251; 429/314; 429/247; 429/129

(58) Field of Classification Search .......... 429/2, 429/251, 144
See application file for complete search history.

(56) References Cited

U.S. PATENT DOCUMENTS

| 4,151,235 | A | * | 4/1979 | May et al. ................ 264/13 |
| 4,556,614 | A | * | 12/1985 | le Mehaute et al. ......... 429/309 |
| 5,925,283 | A | * | 7/1999 | Taniuchi et al. ............ 252/62.2 |
| 6,001,509 | A | * | 12/1999 | Kim et al. ................. 429/309 |
| 2001/0000485 | A1 | | 4/2001 | Ying et al. |
| 2001/0011416 | A1 | * | 8/2001 | Pasquier .................... 29/623.4 |
| 2005/0153209 | A1 | * | 7/2005 | Vallee et al. ............... 429/314 |
| 2005/0266305 | A1 | * | 12/2005 | Ohata et al. ............... 429/144 |
| 2006/0008700 | A1 | * | 1/2006 | Yong et al. ................ 429/144 |
| 2006/0134526 | A1 | | 6/2006 | Han et al. |

FOREIGN PATENT DOCUMENTS

EP 1 667 254 A1 6/2006

OTHER PUBLICATIONS

Krigbaum, W. R., A. M. Kotliar, The Molecular Weight of Polyacrylonitrile, 1958, Journal of Polymer Science, vol. 32, pp. 323-341.*
Polymers: A Property Database, http://polymersdatabase.com, accessed Mar. 26, 2008.*
Asaduzzaman, A. K. M. et al., Solution Properties of Methyl Methacrylate-Acrylonitrile Copolymers, 1993, Journal of Applied Polymer Science, vol. 43, pp. 1813-1819.*
Search Report issued in European Patent Application No. 06117620.2 on Oct. 6, 2006.
Kim, Hyung-Sun et al. "Electrochemical and physical properties of composite polymer electrolyte of poly (methyl methacrylate) and poly (ethylene glycol diacrylate)." Amsterdam: vol. 124, No. 1. Oct. 1, 2003; pp. 221-224.

* cited by examiner

*Primary Examiner*—Dah-Wei D Yuan
*Assistant Examiner*—Zachary Best
(74) *Attorney, Agent, or Firm*—Stein McEwen, LLP

(57) ABSTRACT

A lithium rechargeable battery includes a separator that shows excellent safety characteristics such as short circuit resistance and heat resistance. The lithium rechargeable battery includes a cathode, an anode, a separator that separates the cathode and the anode from each other, and a non-aqueous electrolyte, wherein the separator includes a porous membrane formed of a ceramic material and a binder, and wherein the binder includes at least one crystalline resin having a crystal melting temperature of 250° C. or higher or at least one non-crystalline resin having an initial decomposition temperature of 250° C. or higher.

21 Claims, No Drawings

LITHIUM RECHARGEABLE BATTERY INCLUDING A POROUS MEMBRANE SEPARATOR FORMED OF CERAMIC SECONDARY PARTICLES AND A BINDER

CROSS-REFERENCE TO RELATED APPLICATIONS

This application claims the benefit of Korean Application No. 2005-66872, filed Jul. 22, 2005, in the Korean Intellectual Property Office, the disclosure of which is incorporated herein by reference.

BACKGROUND OF THE INVENTION

1. Field of the Invention

Aspects of the present invention relate to a lithium rechargeable battery. More particularly, aspects of the present invention relate to a lithium rechargeable battery including a separator that provides excellent safety in areas such as short circuit resistance and heat resistance.

2. Description of the Related Art

Recently, as portable electronic instruments have been designed to have a low weight and a compact size, batteries used as drive sources for such instruments have also been required to have a low weight and a high capacity. Active and intensive research and development has been carried out with regard to lithium rechargeable batteries, since lithium rechargeable batteries typically have a drive voltage of 3.6V or higher, which is at least three times higher than the drive voltage of Ni—Cd batteries or Ni-MH batteries, which are currently widely used as power sources for portable electronic instruments. Moreover, lithium rechargeable batteries provide a higher energy density per unit weight than do Ni—CD or Ni-MH batteries.

A lithium rechargeable battery generates electric energy by redox reactions occurring during lithium ion intercalation/deintercalation in a cathode and an anode. A lithium rechargeable battery is obtained by using a material capable of reversible lithium ion intercalation/deintercalation as a cathode active material and an anode active material and by introducing an organic electrolyte or polymer electrolyte between the cathode and the anode.

In general, a lithium rechargeable battery includes: an electrode assembly formed by winding an anode plate, a cathode plate and a separator interposed between both electrode plates into a predetermined shape such as a jelly-roll shape; a can for housing the electrode assembly and an electrolyte; and a cap assembly mounted to the top of the can. The cathode plate of the electrode assembly is electrically connected to the cap assembly via a cathode lead, while the anode plate of the electrode assembly is electrically connected to the can via an anode lead.

The separator in a lithium rechargeable battery has the basic function of separating the cathode and the anode from each other so as to prevent a short circuit. Additionally, it is important for the separator to allow the infiltration of an electrolyte necessary for carrying out electrochemical reactions in the battery and to maintain high ion conductivity. Particularly in the case of a lithium rechargeable battery, the separator is required to have additional functions of preventing substances capable of inhibiting such electrochemical reactions from moving in the battery and/or of ensuring the safety of the battery under abnormal conditions. Generally, the separator includes a microporous polymer membrane based on a polyolefin such as polypropylene or polyethylene, or a multilayer membrane including multiple sheets of such membranes. Such conventional separators have a sheet-like or film-like porous membrane layer, and thus show a disadvantage in that if heat emission occurs by an internal short circuit or an overcharge condition, the pores of the porous membrane may become blocked and the sheet-like separator may shrink. If the sheet-like separator is shrunk by such internal heat emission of the battery, the area covered by the separator may be reduced and the cathode and the anode may come into direct contact with each other, resulting in ignition and explosion of the battery.

Such film-like separators can ensure the safety of a battery upon heat emission caused by a short circuit via a so-called shutdown action that interrupts lithium ion movement (i.e., current flow) by blocking the pores of the separator with a softened polypropylene or polyethylene resin. However, the separators are still disadvantageous when an internal short circuit occurs. For example, using a nail test (penetration) as a substitutive test simulating an internal short circuit condition, it can be shown that the heat emission temperature may locally reach several hundred degrees C. depending on the test conditions, and thus that the porous membrane layer is deformed by the softening or loss of the resin. Further, in the nail test, the test nail penetrates through the cathode and the anode, thereby causing an abnormal overheating phenomenon. Therefore, a separator membrane that utilizes the aforementioned shutdown effect with a softened resin cannot provide an absolute safety measure against an internal short circuit.

Additionally, lithium dendrites may be formed totally on a film-like separator upon overcharge of the lithium rechargeable battery. This is because there is typically a gap between the anode and the film-like separator, and thus, lithium ions that cannot infiltrate into the anode accumulate in the gap between the anode and the film, resulting in the precipitation of lithium metal. If lithium precipitation occurs over the whole surface of the film, such lithium dendrites may penetrate through the film-like separator so that the cathode comes into direct contact with the anode. At the same time, side reactions may occur between lithium metal and the electrolyte to cause heat emission and gas generation, resulting in the ignition and explosion of the battery.

SUMMARY OF THE INVENTION

Accordingly, aspects of the present invention provide a lithium rechargeable battery including a separator that shows excellent thermal and electrical properties, such as heat resistance and electrolyte resistance and provide a lithium rechargeable battery that has excellent safety characteristics, such as short circuit resistance and heat resistance, and exhibits little change in its thickness even when it is stored under high temperature conditions.

According to an aspect of the present invention, there is provided a lithium rechargeable battery that includes: a cathode; an anode; a separator that separates the cathode and the anode from each other; and a non-aqueous electrolyte, wherein the separator includes a porous membrane formed of a ceramic material and a binder, and wherein the binder includes at least one crystalline resin having a crystal melting temperature of 250° C. or higher or at least one non-crystalline resin having an initial decomposition temperature of 250° C. or higher.

According to an aspect of the present invention, the binder may include a crystalline resin having a crystal melting temperature of 250° C.~600° C. or a non-crystalline resin having an initial decomposition temperature of 250° C.~600° C.

According to one embodiment of the present invention, the binder may have an Mn (number average molecular weight) of 30,000~100,000, a Mw (weight average molecular weight) of 100,000~200,000, and a PD (polydispersity) of 1~4.

According to another embodiment of the present invention, the binder may be an elastomeric non-crystalline polymer having high heat resistance, in particular, a polymer including polyacrylonitrile units.

According to another embodiment of the present invention, the porous membrane may be formed on a surface of an anode or cathode by forming a paste comprising the ceramic material, the binder and a solvent on the surface of the anode or cathode, heating the paste at a first temperature to reduce the solvent content to 300 ppm or less, and heating the paste to a second temperature higher than the first temperature to further polymerize the binder.

Additional aspects and/or advantages of the invention will be set forth in part in the description which follows and, in part, will be obvious from the description, or may be learned by practice of the invention.

DETAILED DESCRIPTION OF THE EMBODIMENTS

Hereinafter, aspects of the present invention will be explained in more detail.

The separator according to an embodiment of the present invention includes a porous membrane formed of a ceramic material and a binder. After forming a paste by mixing the ceramic material and the binder in a solvent, the porous membrane may be formed on the cathode or the anode, or both, by using the paste. The porous membrane serves as a film-like separator in a similar manner as a conventional polyethylene (PE) or polypropylene (PP) separator.

One of the chemical properties needed for the binder in order to form the porous membrane is heat resistance. This is because when a battery experiences a safety-related problem, such as overcharging or heat exposure, the anode and the electrolyte create heat emission at a temperature of 200° C. or higher. In localized areas, the heat emission temperature may reach several hundred degrees C., as demonstrated in the aforementioned penetration test that was used as a substitute for an internal short circuit test. Actual temperatures may vary depending on the test conditions. If the binder is a crystalline binder having a low crystal melting temperature or a non-crystalline binder having a low initial decomposition temperature, the porous membrane may be deformed by the softening or loss of the binder resin, so that the test nail may penetrate into the cathode and the anode, resulting in overheating. Therefore, the binder preferably includes at least one crystalline resin having a crystal melting temperature of 250° C. or higher or at least one non-crystalline resin having an initial decomposition temperature of 250° C. or higher. Such resins may include an elastomeric acrylic polymer having non-crystallinity and a high heat resistance, such as, for example, a polymer including acrylonitrile units. A lithium rechargeable battery having a separator that includes a porous membrane including such a polymer as a binder is advantageous, in comparison to a conventional electrode having a porous crystalline membrane with a hard film surface, in that the porous separator is unlikely to be cracked when winding a cathode and anode that both have the porous membrane formed thereon.

According to the recent tendencies toward high-voltage batteries, a battery may have a maximum voltage of 4.4V~4.6V. Under these circumstances, if the porous membrane is formed on the cathode, the binder should have an oxidation potential of 4.4V or higher at 60° C. Also, if the porous membrane is formed on the anode, reductive decomposition should be prevented to a voltage of 0V~4.6V. Therefore, the binder according to an embodiment of the present invention may have an oxidation potential of 4.4V or higher at 60° C.

Additionally, since the porous membrane should be chemically stable with respect to the non-aqueous electrolyte in a lithium rechargeable battery, the binder should have a sufficient electrolyte resistance. For example, when a non-aqueous electrolyte battery including the binder is stored in a chamber at 85° C. for 4 hours or at 60° C. for 5 days, the amount of binder that is dissolved in the electrolyte should not exceed a concentration of 300 ppm.

Further, the binder according to an embodiment of present invention should not include conductive element impurities, such as Fe, Ni, Cu or C, in excess of 1.0 ppm. If the binder includes conductive element impurities exceeding the above range, the resultant battery may experience a short circuit.

The binder that may be used in an embodiment of the present invention includes acrylic rubber having a crosslinked structure. The acrylic rubber having a crosslinked structure may be formed by crosslinking a polymer or copolymer of a main acrylic monomer with a cross-linkable comonomer. If a polymer or copolymer of a main acrylic monomer is used without crosslinking, the polymer or copolymer may be easily cleaved due to its weak bonding structure. However, if a crosslinkable monomer is added to the polymer or copolymer of a main acrylic monomer, the crosslinkable monomer bonds with the polymer or copolymer of the main acrylic monomer, thereby forming a stronger network structure. Such polymers having a network structure cannot be swollen easily in a solvent, and this advantage increases as the crosslinking degree increases. The acrylic rubber binder having a crosslinked structure may include a three dimensional crosslinking structure having 2~10 crosslinking points, or, as a more particular non-limiting example, 4~5 crosslinking points per unit with a molecular weight of 10,000 in the backbone molecule. Therefore, the acrylic rubber binder having a crosslinked structure according to an embodiment of the present invention exhibits a swelling resistance sufficient to prevent swelling from occurring when the porous membrane is impregnated with an electrolyte.

The ceramic material used in the porous membrane (described more fully below) typically has a decomposition temperature of 1000° C. or higher, and the binder used in the porous membrane includes an acrylic rubber binder that has a decomposition temperature of 250° C. or higher. Hence, it is possible to obtain a battery having a high heat resistance and a high stability against an internal short.

The main acrylic monomer that may be used in the present invention may include at least one monomer selected from the group consisting of: an alkoxyalkyl acrylate selected from methoxymethyl acrylate, methoxyethyl acrylate, ethoxyethyl acrylate, butoxyethyl acrylate, methoxyethoxyethyl acrylate and dicyclopentenyloxyethyl acrylate; an alkenyl acrylate or alkenyl methacrylate selected from vinyl methacrylate, vinyl acrylate, allyl methacrylate, 1,1,-dimethylpropenyl methacrylate, 1,1-dimethylpropenyl acrylate, 3,3-dimethylbutenyl methacrylate and 3,3-dimethylbutenyl acrylate; an unsaturated dicarboxylic acid ester selected from divinyl itaconate and divinyl maleate; a vinyl group-containing ether selected from vinyl 1,1-dimethylpropenyl ether and vinyl 3,3-dimethylbutenyl ether; 1-acryloyloxy-1-phenylethene; and methyl methacrylate.

The crosslinkable comonomer that may be used in the present invention may include at least one monomer selected from the group consisting of: an alkyl acrylate selected from 2-ethylhexyl acrylate, methyl acrylate, ethyl acrylate, propyl acrylate, butyl acrylate, octyl acrylate and isooctyl acrylate; an alkenyl chloroacetate selected from vinyl chloroacetate and acryl chloroacetate; an glycidyl group-containing ester or ether selected from the group consisting of glycidyl acrylate, vinyl glycidyl ether and acryl glycidyl ether; an unsaturated carboxylic acid selected from acrylic acid, methacrylic acid and maleic acid; 2-chloroethyl vinyl ether; chloromethyl styrene; and acrylonitrile.

The polymer or copolymer of the main acrylic monomer and the crosslinkable comonomer can be used in a weight ratio between 90:10 and 60:40. As a non-limiting example, the weight ratio of the polymer or copolymer of the main acrylic monomer and the crosslinkable comonomer may be 70:30. As the relative amount of the polymer or copolymer of main acrylic monomer increases, the binder in the porous membrane formed on a cathode or an anode becomes softened due to the elastomeric elasticity and softness, and thus exhibits an improved winding capability. However, if the polymer or copolymer is used in an amount greater than the 90:10 ratio described above, the resultant battery exhibits a degradation in quality because of an increased swellability in the presence of an electrolyte. As the content of the crosslinkable comonomer, which is added to improve crosslinkability, increases, the binder becomes hardened and has a low softness, and thus exhibits a poor winding capability.

The polymer or copolymer of main acrylic monomer may have a weight average molecular weight of 10,000~5,000,000.

If the side branches of the polymer or copolymer of main acrylic monomer are partially capped with alkali metals such as Na or K and the resultant product is blended with the crosslinkable comonomer, the alkali metals are isolated from the polymer or copolymer before crosslinking, thereby forming an acrylic rubber binder having a crosslinked structure.

For example, when polymethyl methacrylate (PMMA), which is used as the polymer or copolymer of main acrylic monomer, is capped with alkali metals, some of the ester side branches are present as carboxylated side branches. Particularly, polymethyl methacrylate having a molecular weight of 100,000~200,000 may be used.

In one embodiment of the present invention, a binder having a crosslinked structure is provided by blending 10 wt % of 2-ethylhexyl acrylate with 90 wt % of PMMA having a molecular weight of about 1,000,000. The PMMA has 4~5 crosslinking points per unit with a molecular weight of 10,000 so as to improve the lifespan and safety, and is partially capped with alkali metals so as to induce crosslinking. Herein, the alkali metals are isolated from the PMMA by a heat treatment at 160° C. before the crosslinking of the binder takes place. The polymerization of acrylic rubber may be generally performed via suspension polymerization, emulsion polymerization, bulk polymerization, solution polymerization, or the like. Additionally, the polymerization may be performed not only in a continuous system but also in a batch system.

To improve the crosslinkability of the binder, the porous membrane may be subjected to a two-step heat treatment process including a heating and drying step and a high-temperature polymerization step. First, paste obtained by mixing the ceramic material, the binder and a solvent is formed on a cathode or an anode or both. Then, the paste is heated at 100~120° C. for 2~5 hours to allow the solvent to evaporate, while carrying out preheating of the binder. After the evaporation of the solvent, the residual solvent content is maintained at a level of 300 ppm or less. Then, polymerization is performed at a high temperature of 150~200° C. for 5~20 hours. Such a two-step heat treatment prevents the porous membrane from cracking and allows the binder to polymerize sufficiently, thereby improving the crosslinkability.

The ceramic material forming the separator according to an embodiment of the present invention comprises secondary particles that are formed by partial sintering or recrystallization of primary particles of ceramic material. The secondary particles may be bonded to each other by the binder, thereby forming a porous membrane. The secondary particles may be present as hexahedral particle clusters (that is, in a shape resembling a bunch of grapes) or as layered particle clusters. Additionally, primary particles of the ceramic material may also be present in the shape of hexahedral particle clusters or layered particle clusters, wherein scale-like particles are stacked and bonded to each other. Preferably, an individual particle, forming the hexahedral particle clusters or the secondary particles, has a size of 0.01~0.3 μm, and an individual scale-like flake, forming the layered particle clusters, has a width of 100 nm~1 μm. The aforementioned dimensions of particles can be determined by observing a photograph of a material having good quality, taken by SEM (scanning electron microscopy).

The ceramic material that is used in the present invention may be, for example, silica ($SiO_2$), alumina ($Al_2O_3$), zirconium oxide ($ZrO_2$), titanium oxide ($TiO_2$), ion conductive glass, or a mixture thereof. As a non-limiting example, the ceramic material may be zirconium oxide.

Zirconium oxide shows excellent dispersibility in terms of the zeta($\xi$) potential relationship when mixing and stirring it with an acrylic rubber binder having a crosslinked structure, thereby providing excellent productivity. Also, zirconium oxide is chemically stable and cost efficient. Moreover, zirconium oxide shows excellent heat conductivity and forms a good p/n bonding along with a lithium compound at high temperature, so that it has diode characteristics. Further, zirconium oxide prevents an excessive amount of lithium ions from being intercalated into an anode.

Other ceramic materials that may be used to form the porous membrane include insulative nitrides, hydroxides or ketones of zirconium, aluminum, silicon or titanium, or combinations thereof. Herein, the term "insulative nitride" is used to exclude a conductive nitride such as titanium nitride (TiN) from the scope of the ceramic materials suitable to be used in the present invention.

To form the secondary particles, various chemical and physical methods can be used. For example, the corresponding material may be completely dissolved or the surface of the primary particles may be partially dissolved by using a chemical substance, followed by recrystallization. Particular examples of the physical methods include application of an external pressure. As a non-limiting example of a physical method, the particles may be heated to a temperature near the melting point of the particles, followed by necking.

When the particles are partially molten or partially sintered to form particle agglomerates, the ceramic material is molten to such a degree that the resultant porous membrane can have a low density. The unique particle shape can be maintained while the paste or dispersion for forming the porous membrane is formed by mixing and agitating the ceramic material with the binder and the solvent.

For example, when the ceramic material (e.g. zirconium oxide) is heated at 900° C. for 10 minutes, a structure of partially sintered particles can be obtained. It is also possible to reprecipitate the ceramic material by dissolving the ceramic material completely by using a solvent providing high solubility to the ceramic material, or by mixing the primary particles with a part of the solvent and removing the solvent.

The ceramic material preferably has a heat expansion ratio of 0.2% or less at 200° C. and a heat expansion ratio of 0.1~0.4% at 400° C. If the ceramic material has a heat expansion ratio greater than the above range, it may cause an increase in the internal pressure of the battery, resulting in deformation of the battery.

For example, the porous membrane, formed of the ceramic material and the acrylic rubber having a crosslinked structure, may have a porosity of at least 50%. Herein, the porosity means the ratio of the vacancy to the total section of the corresponding object, and represents a degree of pore formation of the corresponding object, like bulk porosity. The porosity can be determined by SEM of the section of the material.

When partially sintered particles are used, particle agglomerates are randomly present. The particle agglomerates interrupt the regular spatial packing of particles that can otherwise be seen in a normal crystal structure. In other words, it is difficult for the filler formed of the ceramic material to be packed in a close and dense state in the space corresponding to the separator. Additionally, it is possible to prevent the acrylic resin from being packed in the interstitial volumes of the particles by reducing the proportion of the resin. In this manner, it is possible to increase the porosity of the separator.

Preferably, the ceramic material used in the present invention has a heat conductivity of 10W/(m·K) at a broad range of temperatures ranging from 500° C. to 1000° C.

Additionally, the ceramic material may have a relative permittivity of 1~20. If the ceramic material has a relative permittivity greater than 20, it is difficult to provide sufficient capacity. If the ceramic material has a relative permittivity less than 1, it is difficult to form a material having a band gap.

Further, the ceramic material may exhibit a dielectric loss of $10^{-5}$~$10^{-2}$ at a frequency of 1 MHz. If the dielectric loss is less than $10^{-5}$, it is difficult to obtain a desired band gap due to the low reproducibility and the porous membrane cannot be produced stably. If the dielectric loss is higher than $10^{-2}$, it is difficult to obtain sufficient capacity.

According to an aspect of the present invention, the porous membrane may be attached onto at least one surface of the cathode or the anode, or both, of a lithium rechargeable battery. Each of the cathode and the anode is obtained by applying an electrode slurry composition, including an active material, a binder and a conductive agent, dispersed in a solvent, onto an electrode collector. To form the porous membrane, the paste for forming the porous membrane is further applied onto the electrode coated with the active material, and then the solvent is removed from the applied paste by baking.

The porous membrane may be formed in such a manner that it totally surrounds the electrode plate. For example, the paste for forming the porous membrane may be provided first, wherein the paste includes the ceramic material dispersed uniformly in the mixture of the acrylic rubber binder having a crosslinked structure with the solvent. Then, the electrode plate, including the active material coated on the electrode collector, is dipped into the paste. It is also possible to form the porous membrane by spraying the paste onto the electrode plate.

In the case of a jelly-roll type electrode assembly formed by stacking and winding both electrodes, to form the porous membrane on at least one surface of the cathode surface and the anode surface facing each other, the porous membrane is formed on the outer surface of each electrode. Alternatively, it is possible to form the porous membrane on the inner surface of each electrode. As used herein, the terms "outer" and "inner" refer to an orientation in a wound jelly-roll type electrode assembly. In another variant, it is possible to form the porous membrane on the inner surface as well as the outer surface of either of the cathode and the anode.

When the electrode is dipped into the paste for forming the porous membrane, which includes secondary particles of the ceramic material dispersed uniformly in a liquid mixture of the binder and the solvent, the porous membrane may be present on the inner surface, the outer surface and the upper and lower side surfaces. In other words, all exposed surfaces of the electrode may be covered with the porous membrane. Therefore, it is possible to prevent an electric short circuit between the electrode coated with the porous membrane and another electrode.

The porous membrane may have a thickness that is controlled or selected, taking into consideration the desired ion conductivity and energy density. For example, the porous membrane may have a thickness of 1~40 µm, more preferably 5~20 µm. If the porous membrane has a thickness less than 1 µm, the porous membrane exhibits low strength. If the porous membrane has a thickness greater than 40 µm, it is difficult to obtain a desired level of energy density.

According to an aspect of the present invention, it is preferable to use the acrylic rubber binder having a crosslinked structure in a small amount in the paste or slurry for forming the porous membrane. In the porous membrane according to an aspect of the present invention, the ceramic material and the binder are used in a weight ratio ranging from 95:5 to 80:20. Under the above range of weight ratio, it is possible to prevent the ceramic material from being totally encapsulated with the binder. In other words, it is possible to prevent the problem of limited ion conduction into the ceramic material caused by the total encapsulation of the ceramic material with the binder.

After forming the porous membrane on either or both of the cathode and the anode, both electrodes may be stacked and wound. Since the porous membrane itself functions as a separator, it is possible to avoid a need for an additional separator between both electrodes. Although conventional film-like separators tend to shrink or melt at high temperature, the porous membrane has little possibility of shrinking or melting. As mentioned above, a conventional polyolefin-based film separator may generate a harder or more severe short circuit in response to over-heating, because after an initial portion of the conventional separator is damaged by an initial heat emission, additional portions adjacent to the damaged portion shrink or be melted continuously, thereby increasing the area of the separator that is lost by combustion. However, an electrode having a porous membrane according to an aspect of the present invention is only slightly damaged at the site where an internal short circuit occurs, and the short circuit does not extend to a greater area. Additionally, the electrode having the porous membrane does not cause a hard short circuit but rather, a soft short circuit upon overcharge, and thus consumes overcharged current continuously and maintains a constant voltage of 5V~6V and a battery temperature of 100° C. or less. As a result, it is possible to improve overcharge stability by using the electrode having the porous membrane as described herein.

However, an additional, polyolefin-based separator film may be present between both electrodes in a wound electrode assembly as in a conventional lithium rechargeable battery. In this case, both the porous membrane and the polyolefin-based separator film serve as separators for the resulting rechargeable battery. The polyolefin-based film separator that may be used in the present invention may comprise a single-layer film of polyethylene or polypropylene, or a multilayer film of polypropylene-polyethylene-polypropylene.

The cathode of the lithium rechargeable battery includes a cathode active material capable of lithium ion intercalation/deintercalation. As non-limiting examples, cathode active materials that may be used include at least one composite oxide containing lithium and at least one element selected from the group consisting of cobalt, manganese and nickel. Typical examples of the cathode active material that may be used in the present invention include the following composite oxides (1) to (13):

$$Li_xMn_{1-y}M_yA_2 \quad (1)$$

$$Li_xMn_{1-y}M_yO_{2-z}X_z \quad (2)$$

$$Li_xMn_2O_{4-z}X_z \quad (3)$$

$$Li_xMn_{2-y}M_yM'_zA_4 \quad (4)$$

$$Li_xCo_{1-y}M_yA_2 \quad (5)$$

$$Li_xCo_{1-y}M_yO_{2-z}X_z \quad (6)$$

$$Li_xNi_{1-y}M_yA_2 \quad (7)$$

$$Li_xNi_{1-y}M_yO_{2-z}X_z \quad (8)$$

$$Li_xNi_{1-y}Co_yO_{2-z}X_z \quad (9)$$

$$Li_xNi_{1-y-z}Co_yM_zA_\alpha \quad (10)$$

$$Li_xNi_{1-y-z}Co_yM_zO_{2-\alpha}X_\alpha \quad (11)$$

$$Li_xNi_{1-y-z}Mn_yM_zA_\alpha \quad (12)$$

$$Li_xNi_{1-y-z}Mn_yM_zO_{2-\alpha}X_\alpha \quad (13)$$

wherein $0.9 \leq x \leq 1.1$; $0 \leq y \leq 0.5$; $0 \leq z \leq 0.5$; $0 \leq \alpha \leq 2$; M and M' are the same or different, and each of M and M' is selected from the group consisting of Mg, Al, Co, K, Na, Ca, Si, Ti, Sn, V, Ge, Ga, B, As, Zr, Mn, Cr, Fe, Sr, V and rare earth elements; A is selected from the group consisting of O, F, S and P; and X is selected from the group consisting of F, S and P.

The anode of the lithium rechargeable battery includes an anode active material capable of lithium ion intercalation/deintercalation. Such anode active materials may include carbonaceous materials such as crystalline carbon, amorphous carbon, carbon composites and carbon fiber, lithium metal and lithium alloys. For example, the amorphous carbon includes hard carbon, cokes, mesocarbon microbeads (MCMB) fired at a temperature of 1500° C. or lower, mesophase pitch-based carbon fiber (MPCF), etc. The crystalline carbon includes graphite materials, and particular examples thereof include natural graphite, graphitized cokes, graphitized MCMB, graphitized MPCF, etc. As a non-limiting example, the carbonaceous material may have a d(002) value (interplanar distance) of between 3.35 Å and 3.38 Å, and an Lc value (crystallite size) of at least 20 nm, as measured by X-ray diffraction. Particular examples of the lithium alloys that may be used in the present invention include alloys of lithium with aluminum, zinc, bismuth, cadmium, antimony, silicon, lead, tin, gallium or indium.

The cathode collector may include aluminum or aluminum alloy, while the anode collector may include copper or copper alloy. The cathode collector and the anode collector may take the form of foil, a film, a sheet, a punched body, a porous body or a foamed body.

The cathode and the anode may further comprise a conductive agent in order to improve the conductivity. The conductive agent that may be used includes at least one conductive agent selected from the group consisting of a graphite-based conductive agent, a carbon black-based conductive agent, and a metal- or a metallic compound-based conductive agent. Particular examples of the graphite-based conductive agent include artificial graphite and natural graphite; particular examples of the carbon black-based conductive agent include acetylene black, ketjen black, denka black, thermal black and channel black and particular examples of the metal- or metallic compound-based conductive agent include tin, tin oxide, tin phosphate ($SnPO_4$), titanium oxide, potassium titanate and perovskite substances such as $LaSrCoO_3$ and $LaSrMnO_3$. However, the scope of the present invention is not limited to the above examples. The conductive agent is preferably used in an amount of 0.1~10 wt % based on the weight of the cathode active material. If the conductive agent is used in an amount less than 0.1 wt %, electrochemical characteristics may be degraded. On the other hand, if the conductive agent is used in an amount greater than 10 wt %, energy density per unit weight decreases.

The binder for the electrode active material serves to accomplish paste formation of the active material, adhesion of the active material particles and adhesion of the active material to the collector, and provides a buffering effect to minimize swelling and shrinkage of the active material. Particular examples of the binder include polyvinylidene fluoride, polyhexafluoropropylene-polyvinylidene fluoride copolymer (PVDF/HFP), poly(vinyl acetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoroethylene, polyvinyl chloride, polyacrylonitrile, polyvinyl pyridine, styrene-butadiene rubber, acrylonitrile-butadiene rubber, or the like. The binder may be used in an amount of 0.1~30 wt %, based on the weight of the electrode active material. For example, the binder may be used in an amount of 1~10 wt %. If the binder is used in an excessively small amount, adhesion between the electrode active material and the collector may not be sufficient. If the binder is used in an excessively large amount, adhesion may be improved but it may be impossible to obtain a high battery capacity due to the reduced amount of electrode active material.

The solvent for use in dispersing the electrode active material, the binder and the conductive agent includes a non-aqueous solvent or an aqueous solvent. Particular examples of the non-aqueous solvent include N-methyl-2-pyrrolidone (NMP), dimethyl formamide, dimethyl acetamide, N,N-dimethylaminopropylamine, ethylene oxide, tetrahydrofuran, or the like.

When the porous membrane according to an aspect of the present invention is formed on an anode, if the binder used in the anode active material is an aqueous binder such as styrene-butadiene rubber, the binder that is used in the porous membrane may be an organic binder. On the other hand, if the binder used in the anode active material is an organic binder, such as polyvinylidene fluoride, the binder used in the porous membrane may be an aqueous binder. Otherwise, if the same organic or aqueous binder is used in both of the anode active material layer and the porous membrane, the solvent for dispersing the components of the active material and the porous membrane would also be an organic or aqueous solvent in the same manner. Then, when the paste for forming the porous membrane is coated onto a preformed anode active material layer, this may produce the undesirable result that the coated and dried anode active material layer dissolves back into the solvent for the paste for forming the porous membrane.

When an organic binder is used, the solvent that may be used to provide the paste for forming the porous membrane may include NMP/cyclohexanone (volume ratio=100~50:50, or, for example 30:70), or other mixed solvents containing cyclohexanone and using isopropyl alcohol, toluene or xylene instead of NMP. When the binder for the anode active material is an organic binder, it is preferable to use an aqueous binder as the binder for forming the paste of the porous membrane and to use water as the solvent for the paste.

The non-aqueous electrolyte for a lithium rechargeable battery includes a lithium salt and a non-aqueous organic solvent. The non-aqueous electrolyte may further include other additives for improving charge/discharge characteristics and for preventing overcharge. The lithium salt serves as a source for supplying lithium ions in a battery and empowers a lithium rechargeable battery to perform basic functions. The non-aqueous organic solvent functions as a medium through which ions participating in electrochemical reactions in a battery can move.

The lithium salt that may be used includes any one salt selected from the group consisting of $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $C_4F_9SO_3$, $LiAlO_4$, $LiAlCl_4$, LiCl and LiI, or a mixture containing two or more of them. As non-limiting examples, the lithium salt may be used in a concentration of 0.6~2.0M, or more particularly, in a concentration of 0.7~1.6M. If the lithium salt concentration is less than 0.6M, the resultant electrolyte may have a low conductivity, resulting in degradation in the quality of the electrolyte. If the lithium salt concentration is greater than 2.0M, the resultant electrolyte has an increased viscosity, resulting in a drop in the lithium ion conductivity.

The non-aqueous organic solvent may include carbonates, esters, ethers or ketones, alone, or in combination. The organic solvent should have a high dielectric constant (polarity) and low viscosity so as to increase the ion dissociation degree and to facilitate ion conduction. As a non-limiting example, a mixed solvent containing at least two solvents, including a solvent with a high dielectric constant and high viscosity and a solvent with a low dielectric constant and low viscosity, may be used.

As a non-limiting example of the non-aqueous organic solvents, the carbonate solvent may include a mixed solvent of a cyclic carbonate with a linear carbonate. Particular examples of the cyclic carbonate include ethylene carbonate (EC), propylene carbonate (PC), 1,2-butylene carbonate, 2,3-butylene carbonate, 1,2-pentylene carbonate, 2,3-pentylene carbonate, etc. As specific non-limiting examples, ethylene carbonate and propylene carbonate having a high dielectric constant may be used. When artificial graphite is used as an anode active material, ethylene carbonate may be used, as a specific non-limiting example. Particular examples of the linear carbonate include dimethyl carbonate (DMC), diethyl carbonate (DEC), dipropyl carbonate (DPC), methyl propyl carbonate (MPC), ethyl methyl carbonate (EMC), ethyl propyl carbonate (EPC), etc. As specific non-limiting examples, dimethyl carbonate, ethyl methyl carbonate and diethyl carbonate having a low viscosity may be used.

Particular examples of the ester that may be used in the non-aqueous electrolyte include methyl acetate, ethyl acetate, propyl acetate, methyl propionate, ethyl propionate, γ-butyrolactone (GBL), γ-valerolactone, γ-caprolactone, δ-valerolactone, ε-caprolactone, etc. Particular examples of the ether include tetrahydrofuran, 2-methyltetrahydrofuran, dibutyl ether, etc. Particular examples of the ketone include polymethyl vinyl ketone, etc.

EXAMPLE 1

An acrylic rubber binder based on PMMA was provided by mixing 10 wt % of 2-ethylhexyl acrylate having a molecular weight of 150,000 with 90 wt % of polymethyl methacrylate (PMMA) having a molecular weight of 1,000,000 and crosslinking them at 160° C. The binder including PMMA partially capped with alkali metals (Na, K) was used.

EXAMPLE 2 t-Butylacrylate and methyl methacrylate were mixed at the mol weight ratio of 95:5, and then, peroxide as a heat decomposition initiator was added thereto and reacted through the bulk polymerization method for 6~10 hours to provide a bulky type binder.

EXAMPLES 3 AND 4

2-Ethylhexylacrylate and methylmethacrylate were mixed at the mol weight ratio of 95:5, and then, a peroxide was added thereto and reacted through suspension polymerization and solution polymerization for 6~10 hours respectively, so as to provide the binders of examples 3 and 4 with the structure of a highly-branched polymer.

COMPARATIVE EXAMPLES 1 AND 2

Polyvinylidene fluoride (PVDF) was used as the binder of Comparative Example 1 and a blend of styrene-butadiene rubber (SBR) with carboxymethyl cellulose (CMC) was used as the binder of Comparative Example 2.

<Oxidation Potential at 60° C. and Initial Decomposition Temperature>

Each of the binders according to Example 1 and Comparative Examples 1 and 2 was measured for its initial oxidation potential at 60° C. and heat resistance (i.e. initial decomposition temperature). The oxidation potential was measured by means of CV (cyclic voltammetry). A platinum electrode was used as a working electrode, and lithium metal was used not only as a reference electrode but also as a counter electrode. The platinum electrode was surface-coated with the binder, and a mixed solvent of ethylene carbonate (EC)/ethyl methyl carbonate (EMC) (v/v=3:7) containing 1.0M $LiPF_6$ dissolved therein was used as an electrolyte. The cyclic voltammetry was performed at a voltage of 3~7V and a scanning rate of 5 mV/s.

Since PVDF is a crystalline polymer, its melting point was measured by DSC (differential scanning calorimetry) and its initial decomposition temperature was measured by TGA (thermogravimetric analysis) (ambient condition, TGA method: 10° C./min.). Since SBR and the acrylic rubber are not crystalline polymers, it was not possible to measure their melting points by DSC. Thus, each of SBR and the acrylic rubber was measured for its initial decomposition temperature, where the sample experiences a change in the structure. The results are shown in the following Table 1.

TABLE 1

| | Binder | Initial oxidation potential at 60° C. | Melting point measured by DSC (° C.) | Initial decomposition temperature measured by TGA (° C.) |
|---|---|---|---|---|
| Ex. 1 | PMMA-based acrylic rubber | 4.40 V or higher | — | 280 |
| Comp. Ex. 1 | PVDF | 4.30 V or lower | 170 | 450 |
| Comp. Ex. 2 | SBR + CMC | 4.25 V or lower | — | 225 |

As shown in Table 1, PVDF and SBR+CMC, currently used as binders in cathodes and anodes, shows a low initial oxidation potential as well as a low initial decomposition temperature. However, the acrylic rubber having a crosslinked structure according to Example 1 shows an oxidation potential of 4.4V or higher at 60° C. and an initial decomposition temperature of 250° C. or higher.

As can be seen from the results as shown in Table 1, PVDF, a crystalline polymer, has a melting point (i.e., temperature where the crystals start to break) of 170° C. and a decomposition temperature (i.e., temperature where the polymer experiences a change in the weight) of 450° C. Even if PVDF has a decomposition temperature of 450° C., crystals of the PVDF binder in a battery are broken at 170° C. (i.e. melting point of PVDF), and the PVDF binder cannot serve as a binder at temperatures greater than 170° C. In other words, PVDF cannot satisfy the condition of the initial decomposition temperature required for the binder according to aspects of the present invention. On the other hand, it was not possible to measure the melting point of the binder of Example 1, i.e., the acrylate-based rubber by DSC, because the acrylate rubber is not a crystalline polymer. Therefore, it is only possible to measure a weight change of the acrylate rubber by TGA. The temperature at which the acrylate rubber having a crosslinked structure experiences a change in the weight, was found to be 280° C., and thus the acrylate rubber shows a high temperature resistance at temperatures higher than 170° C. (i.e., melting point of a PVDF-based binder). As a result, the binder according to an aspect of the present invention can last at a higher temperature for a longer period of time, when compared to PVDF.

Additionally, each of the binders according to Examples 2 to 4 was analyzed by FT-IR, TGA and GPC. The results are shown in the following Table 2. FT-IR, TGA and GPC were performed under the following conditions:

FT-IR: ATR (attenuated total reflectance) after the evaporation of the solvent.

TGA: 20° C./min.→600° C., N₂atmosphere

GPC: Column: KF G+KF806+KF802+KF801

Mobile phase: THF 100% (tetrahydrofuran)

Standard: PMMA (903000; 366000; 182000; 93300; 10900; 2580)

Solvent for pretreatment: THF

TABLE 2

| | FT-IR | TGA | GPC |
|---|---|---|---|
| Ex. 2 | A: Poly(t-butyl acrylate) (—CH2CH[CO2C(CH3)3]—)x | Decomposition temperature 410° C. | Mn 39729 Mw 125425 PD (Mw/Mn) 3.15 |

TABLE 2-continued

| | FT-IR | TGA | GPC |
|---|---|---|---|
| Ex. 3 | B: Poly(hexyl acrylate) (—CH2CH[CO2(CH2)5CH3]—)x | Decomposition temperature 410° C. | Mn 53662 Mw 179601 PD (Mw/Mn) 3.34 |
| Ex. 4 | C: Poly(hexyl acrylate) (—CH2CH[CO2(CH2)5CH3]—)x | Decomposition temperature 410° C. | Mn 98127 Mw 198871 PD (Mw/Mn) 2.02 |

As shown in Table 2, each binder of Examples 2 to 4 shows a decomposition temperature of 410° C., which is higher than 250° C.

<Manufacture of Rechargeable Battery>

EXAMPLES 5 AND 6 AND COMPARATIVE EXAMPLES 3 AND 4

LiCoO₂ as a cathode active material, polyvinylidene fluoride as a binder and carbon as a conductive agent were dispersed in N-methyl-2-pyrrolidone as a solvent in the weight ratio of 92:4:4 to form cathode active material slurry. The slurry was coated on aluminum foil having a thickness of 20 µm, dried and rolled to provide a cathode. Artificial graphite as an anode active material, styrene-butadiene rubber as a binder and carboxymethyl cellulose as a thickening agent were mixed in the weight ratio of 96:2:2, and the mixture was dispersed in water to form anode active material slurry. The slurry was coated on copper foil having a thickness of 15 µm, dried and rolled to provide an anode.

Then, 96 wt % of secondary particles of zirconium oxide (ZrO₂) powder as a ceramic material were mixed with 4 wt % of one of the acrylic rubbers based on polymethyl methacrylate (PMMA) having the concentration of impurities as shown in the following Table 3. To determine the concentration of impurities, each acrylic rubber binder was analyzed by GC-MS and fluorescence X-ray spectrometry to measure the content of conductive elements. The mixture was diluted with a mixed solvent of N-methyl-2-pyrrolidoe/cyclohexanone (volume ratio: 3:7) to a viscosity of about 3000 cps, thereby providing a mixed solution. The anode plate was dipped into the mixed solvent, and the coating thickness was controlled by using a gravure roller. Next, the coated anode plate was passed through a drier at 120° C. to remove the solvent, thereby forming a porous membrane on the anode with a thickness of 10 µm.

The cathode and the anode obtained as described above were wound and compressed, and then the resultant unit cell was inserted into a prismatic can. Then, an electrolyte was injected to the can to provide a lithium rechargeable battery. The electrolyte was a mixed solvent of ethylene carbonate with ethylmethyl carbonate (wherein volume ratio of EC:EMC=3:7), containing 1.3M LiPF$_6$ dissolved therein.

<Test for Generation of Short Circuit in Battery>

Each of the batteries according to Examples 5 and 6 and Comparative Examples 3 and 4 was subjected to a test for generation of a short circuit. The results are shown in the following Table 3.

TABLE 3

|  | Impurity content (conductive elements such as Fe, Cu, Ni and C) | % of batteries generating short circuit |
| --- | --- | --- |
| Ex. 5 | 0.5 ppm | 0% |
| Ex. 6 | 1.0 ppm | 0% |
| Comp. Ex. 3 | 1.5 ppm | 5% |
| Comp. Ex. 4 | 2.0 ppm | 10% |

As shown in Table 3, in order to prevent a battery from generating a short circuit, conductive element impurities such as Fe, Cu, Ni and C should not be present in the binder in excess of 1.0 ppm.

EXAMPLES 7 TO 11 AND COMPARATIVE EXAMPLE 5

Batteries were constructed as described in Example 5, except that a series of acrylic rubbers based on PMMA having different degrees of solubility to the electrolyte as shown in the following Table 4 were used as binders for the porous membrane.

<Solubility of Binder and High-Temperature Storage Characteristics of Battery>

The solubility of the binders was measured as follows. Each binder was coated and dried on aluminum foil. Next, the coated foil was dipped into an electrolyte including a mixed solvent of ethylene carbonate with ethylmethyl carbonate (wherein volume ratio of EC:EMC=50:50), containing 1.3M LiPF$_6$ dissolved therein, and then stored in a chamber at 85° C. for 4 hours, and at 60° C. for 5 days. The solubility of the binder to the electrolyte was measured by determining discoloration of the electrolyte and by analyzing the electrolyte by GC-MS. The batteries according to Examples 7 to 11 and Comparative Example 5, obtained by using binders having different degrees of solubility to the electrolyte, were subjected to a 20 mAh cut-off charge under 1C/4.2V constant current-constant voltage conditions. After each battery was stored in a chamber at 85° C. for 4 hours, and at 60° C. for 5 days, the battery was measured for a change in the thickness. The results are shown in the following Table 4. In Table 4, "thickness change" means the ratio of [thickness of a battery swollen after the high temperature storage conditions—initial thickness] to the initial thickness.

TABLE 4

|  | Solubility after storage at 85° C. for 4 hours | Solubility after storage at 60° C. for 5 days | Thickness change (after storage at 85° C. for 4 hours) | Thickness change (after storage at 60° C. for 5 days) |
| --- | --- | --- | --- | --- |
| Ex. 7 | 100 ppm | 150 ppm | 105% | 106% |
| Ex. 8 | 135 ppm | 140 ppm | 115% | 116% |
| Ex. 9 | 150 ppm | 170 ppm | 125% | 119% |
| Ex. 10 | 200 ppm | 230 ppm | 130% | 129% |
| Ex. 11 | 300 ppm | 290 ppm | 145% | 136% |
| Comp. Ex. 5 | 400 ppm | 390 ppm | 170% | 168% |

As shown in Table 4, in order to have a thickness (swelling) under high-temperature storage conditions that is acceptable by general battery producers, a binder should have such a degree of electrolyte resistance that after the binder in the electrolyte is stored at 85° C. for 4 hours, and at 60° C. for 5 days, the binder is dissolved in the electrolyte to an amount of at most 300 ppm.

COMPARATIVE EXAMPLES 6 TO 11 AND EXAMPLES 12 AND 13

A porous membrane was formed on an anode plate in the same manner as in Example 5, except that 97 wt % of powder of alumina (Al$_2$O$_3$) particles were used as a ceramic material and the binder as shown in the following Table 5 was used to provide a mixed solution of inorganic oxide, and a layer of inorganic oxide was formed on the anode plate to a thickness of 30 μm.

<Winding Characteristics Depending on Type of Binder>

Each of the electrode plates according to Comparative Examples 6 to 11 and Examples 12 and 13 was wound around a cylindrical bar having a diameter ranging from 1 mmϕ to 5 mmϕ at an interval of 0.5 mm. Whether any cracking occurred was determined by using a microscope. Herein, a decreased diameter of the cylindrical bar at which cracking occurs indicates an increased flexibility of the electrode plate wound around the cylindrical bar.

TABLE 5

|  | Type of binder (3 wt %) | Winding Test |
| --- | --- | --- |
| Comp. Ex. 6 | PVDF(Polyvinylidene fluoride) | Cracking @ 4.5 mmϕ |
| Comp. Ex. 7 | SBR(Styrene-butadiene rubber) | Cracking @ 4.0 mmϕ |
| Comp. Ex. 8 | Methoxymethylacrylate | Cracking @ 3.0 mmϕ |
| Comp. Ex. 9 | Methoxyethylacrylate | Cracking @ 3.5 mmϕ |
| Comp. Ex. 10 | Etoxyethylacrylate | Cracking @ 3.0 mmϕ |
| Comp. Ex. 11 | Butoxyethylacrylate | Cracking @ 3.5 mmϕ |
| Ex. 12 | Polymer blend of Acrylonitrile + Metoxyethylacrylate | Cracking @ 1.5 mmϕ |
| Ex. 13 | Polymer blend of Acrylonitrile + Etoxyethylacrylate | Cracking @ 2.5 mmϕ |

As shown in Table 5, an acrylic rubber-based binder provides excellent flexibility. Particularly, a binder containing acrylonitrile units provides more excellent flexibility As can be seen from the foregoing, aspects of the present invention provide a lithium rechargeable battery including a separator that has excellent safety characteristics such as short circuit resistance and heat resistance. Additionally, the lithium rechargeable battery according to aspects the present invention has excellent safety characteristics such as short circuit resistance and heat resistance, and exhibits little change in its thickness even under high-temperature storage conditions.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium rechargeable battery comprising a cathode, an anode, a separator that separates the cathode and the anode from each other, and a non-aqueous electrolyte, wherein the separator includes a porous membrane formed of a ceramic material and a binder, wherein the binder is an acrylic rubber formed by crosslinking of a polymer or copolymer of a main acrylic monomer with a crosslinkable comonomer, wherein the binder has an initial decomposition temperature of 250° C or higher and exhibits a swelling resistance when the porous membrane is impregnated with the non-aqueous electrolyte, wherein the ceramic material comprises secondary particles made up of sintered or recrystallized ceramic primary particles, and wherein the ceramic material and the binder are mixed in a weight ratio of 95:5 ~80:20.

2. The lithium rechargeable battery as claimed in claim 1, wherein the binder has an initial decomposition temperature of 250° C. ~600° C.

3. The lithium rechargeable battery as claimed in claim 1, wherein the binder has an Mn (number average molecular weight) of 30,000~100,000, an Mw (weight average molecular weight) of 100,000~200,000, and a PD (polydispersity) of 1~4.

4. The lithium rechargeable battery as claimed in claim 1, wherein the binder has an oxidation potential of 4.4V or higher at 60° C.

5. The lithium rechargeable battery as claimed in claim 1, wherein an amount of conductive element impurities in the binder is 1.0 ppm or less.

6. The lithium rechargeable battery as claimed in claim 5, wherein the conductive element is at least one element selected from Fe, Ni, Cu and C.

7. The lithium rechargeable battery as claimed in claim 1, wherein the binder has a solubility of 300 ppm or less to an electrolyte when it is stored in the electrolyte at 85° C. for 4 hours or at 60° C. for 5 days.

8. The lithium rechargeable battery as claimed in claim 1, wherein the main acrylic monomer is at least one monomer selected from the group consisting of: an alkoxyalkyl acrylate selected from methoxymethyl acrylate, methoxyethyl acrylate, ethoxyethyl acrylate, butoxyethyl acrylate, methoxyethoxyethyl acrylate and dicyclopentenyloxyethyl acrylate; an alkenyl acrylate or alkenyl methacrylate selected from vinyl methacrylate, vinyl acrylate, allyl methacrylate, 1,1,-dimethylpropenyl methacrylate, 1,1-dimethylpropenyl acrylate, 3,3-dimethylbutenyl methacrylate and 3,3-dimethylbutenyl acrylate; an unsaturated dicarboxylic acid ester selected from divinyl itaconate and divinyl maleate; a vinyl group-containing ether selected from vinyl 1,1-dimethylpropenyl ether and vinyl 3,3-dimethylbutenyl ether; 1-acryloyloxy-1-phenylethene; and methyl methacrylate.

9. The lithium rechargeable battery as claimed in claim 1, wherein the crosslinkable comonomer is at least one monomer selected from the group consisting of: an alkyl acrylate selected from 2-ethylhexyl acrylate, methyl acrylate, ethyl acrylate, propyl acrylate, butyl acrylate, octyl acrylate and isooctyl acrylate; an alkenyl chloroacetate selected from vinyl chloroacetate and acrylchloroacetate; an glycidyl group-containing ester or ether selected from glycidyl acrylate, vinylglycidyl ether and acrylglycidyl ether; an unsaturated carboxylic acid selected from acrylic acid, methacrylic acid and maleic acid; 2-chloroethyl vinyl ether; chloromethyl styrene; and acrylonitrile.

10. The lithium rechargeable battery as claimed in claim 1, wherein the polymer or copolymer of the main acrylic monomer has a weight average molecular weight of 10,000~5,000,000.

11. The lithium rechargeable battery as claimed in claim 1, wherein the polymer or copolymer of the main acrylic monomer is mixed with the crosslinkable comonomer in a weight ratio ranging from 90:10 to 60:40.

12. The lithium rechargeable battery as claimed in claim 1, wherein the polymer or copolymer of the main acrylic monomer is mixed with the crosslinkable comonomer in a weight ratio of 70:30.

13. The lithium rechargeable battery as claimed in claim 1, wherein the primary particles or the secondary particles include hexahedral particle clusters or layered particle clusters.

14. The lithium rechargeable battery as claimed in claim 13, wherein the primary particles having the form of hexahedral particle clusters have a diameter of 0.01 ~0.3μm.

15. The lithium rechargeable battery as claimed in claim 13, wherein the primary particles having the form of layered particle clusters include scale-like flakes having a width of 100nm~1 μm.

16. The lithium rechargeable battery as claimed in claim 10, wherein the ceramic material is at least one material selected from the group consisting of silica ($SiO_2$), alumina ($Al_2O_3$), zirconium oxide ($ZrO_2$), and titanium oxide ($TiO_2$).

17. The lithium rechargeable battery as claimed in claim 1, wherein the separator further includes a polyolefin-based resin film in addition to the porous membrane.

18. The lithium rechargeable battery as claimed in claim 1, wherein the porous membrane is present on at least one of the cathode and the anode.

19. The lithium rechargeable battery as claimed in claim 1, wherein the porous membrane is formed to a thickness of 1~40μm.

20. A method of forming the porous membrane of claim 1, on a surface of an anode or cathode, the method comprising:
    forming a paste comprising the ceramic material, a binder comprising a polymer or copolymer of a main acrylic monomer and a crosslinkable monomer, wherein the ceramic material and the binder are mixed in a weight ratio of 95:5~80:20, and a solvent on the surface of the anode or cathode,
    heating the paste at a first temperature to reduce the solvent content to 300ppm or less, and
    heating the paste to a second temperature higher than the first temperature to further polymerize and crosslink the binder.

21. A lithium rechargeable battery comprising a cathode, an anode, a separator that separates the cathode and the anode from each other, and a non-aqueous electrolyte, wherein the separator includes a porous membrane formed of a ceramic material and a binder, wherein the binder is a polymer blend of acrylonitrile and methoxyethylacrylate or a polymer blend of acrylonitrile and ethoxyethylacrylate, wherein the binder has an initial decomposition temperature of 250° C. or higher and exhibits a swelling resistance when the porous membrane is impregnated with the non-aqueous electrolyte, wherein the ceramic material comprises secondary particles made up of sintered or recrystallized ceramic primary particles and wherein the ceramic material and the binder are mixed in a weight ratio of 95:5~80:20.

* * * * *

UNITED STATES PATENT AND TRADEMARK OFFICE
CERTIFICATE OF CORRECTION

PATENT NO. : 7,659,036 B2
APPLICATION NO. : 11/489536
DATED : February 9, 2010
INVENTOR(S) : Jinhee Kim et al.

Page 1 of 1

It is certified that error appears in the above-identified patent and that said Letters Patent is hereby corrected as shown below:

Title Page, Item (75) Inventors, change "Jaevun Min" to --Jaeyun Min--.

Column 18, line 59, change "non-aq ueous" to --non-aqueous--.

Signed and Sealed this

First Day of June, 2010

David J. Kappos
*Director of the United States Patent and Trademark Office*